(12) United States Patent
Takayama

(10) Patent No.: US 6,326,332 B1
(45) Date of Patent: Dec. 4, 2001

(54) DECOLORABLE MATERIAL AND METHOD FOR DECOLORING THE SAME

(75) Inventor: Satoshi Takayama, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/534,046

(22) Filed: Mar. 24, 2000

(30) Foreign Application Priority Data

Mar. 31, 1999 (JP) .................................................. 11-093917

(51) Int. Cl.$^7$ ...................................................... B41M 5/30
(52) U.S. Cl. .................. 503/201; 106/31.17; 106/31.23; 503/205; 503/216
(58) Field of Search ...................................... 503/201, 205, 503/216, 204; 106/31.17, 31.23

(56) References Cited

U.S. PATENT DOCUMENTS

| | | | |
|---|---|---|---|
| 5,130,290 | 7/1992 | Tanimoto | 503/201 |
| 5,407,890 | 4/1995 | Ishikawa | 503/201 |
| 5,663,115 | 9/1997 | Naito et al. | 503/201 |
| 5,679,615 | * 10/1997 | Matsumoto et al. | 503/217 |
| 5,922,115 | 7/1999 | Sano et al. | 106/31.32 |

FOREIGN PATENT DOCUMENTS

| | | |
|---|---|---|
| 0 980 028 | 2/2000 | (EP). |
| 0 987 123 | 3/2000 | (EP). |
| 1-138274 | 5/1989 | (JP). |

OTHER PUBLICATIONS

Patent Abstracts of Japan, vol. 12, No. 164 (M–698), May 18, 1988, JP 62 280076, Dec. 4, 1987.
Patent Abstracts of Japan, vol. 1998, No. 08, Jun. 30, 1998, JP 10 077437, Mar. 24, 1998.
Derwent Publications, AN 1989–201429, JP 01 138275, May 31, 1989.
Derwent Publications, AN 1993–162040, JP 05 092661, Apr. 16, 1993.
Derwent Publications, AN 1995–101589, JP 07 025165, Jan. 27, 1995.

\* cited by examiner

*Primary Examiner*—Bruce H. Hess
(74) *Attorney, Agent, or Firm*—Oblon, Spivak, McCelland, Maier & Neustadt, P.C.

(57) ABSTRACT

A decolorable material contains a color former, a developer, a matrix material, and a decolorant capable of physically or chemically adsorbing the developer, the developer having a molecular weight of 120 to 210. The material is capable of forming a clear image, and the image formed from the material can be decolored well, even when the amount of the decolorant used is small.

9 Claims, 1 Drawing Sheet

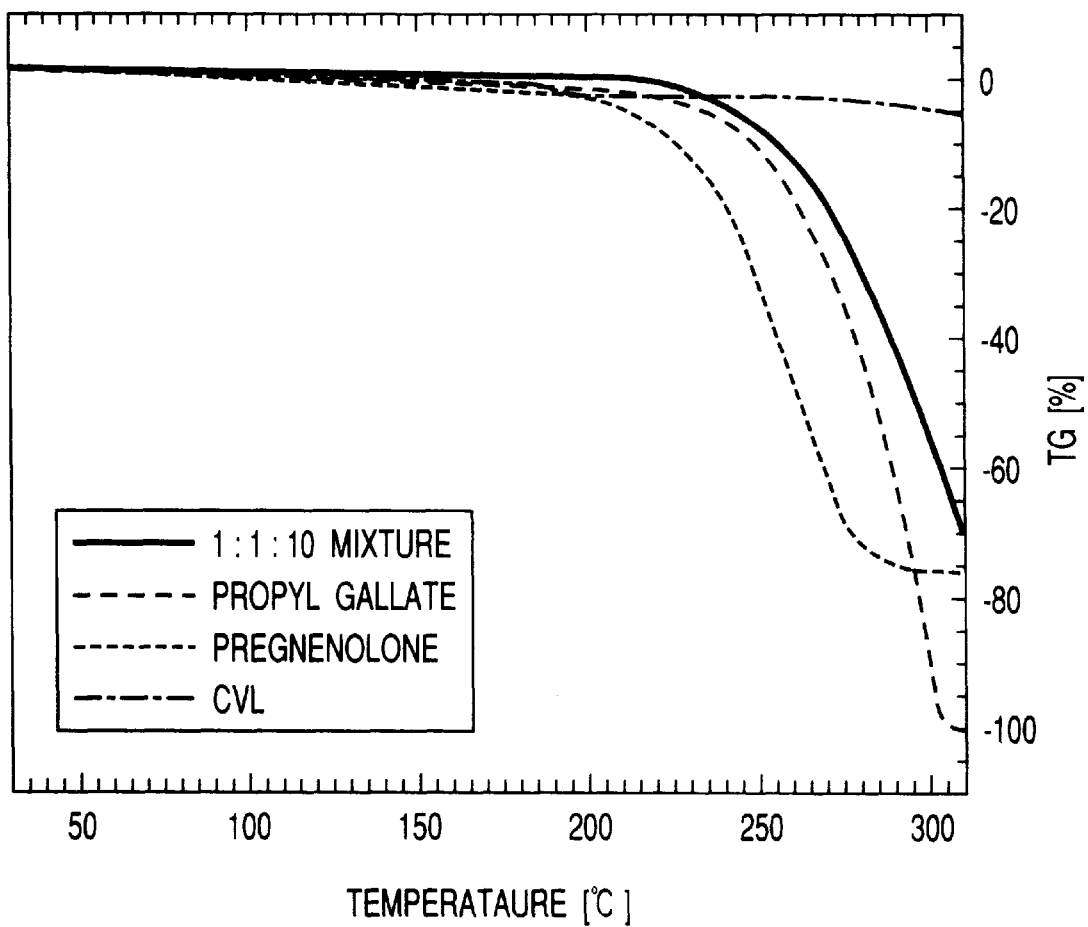
FIGURE

DECOLORABLE MATERIAL AND METHOD FOR DECOLORING THE SAME

CROSS-REFERENCE TO RELATED APPLICATIONS

This application is based upon and claims the benefit of priority from the prior Japanese Patent Application No. 11-093917, filed Mar. 31, 1999, the entire contents of which are incorporated herein by reference.

BACKGROUND OF THE INVENTION

The present invention relates to an image forming material that can be formed into an image by electrophotography, thermal transfer recording, writing tools or printing, and that can be decolored by control of thermal hysteresis or by contact with a solvent.

With the recent progress of office automation, the amounts of various pieces of information are significantly increasing, and information output is increasing accordingly. Information output is represented by display output and hard copy output from printers to paper sheets. However, display output requires a large-scale circuit board in a display unit and hence has problems in portability and cost. Hard copy output uses a large amount of paper as a recording medium when the information amount increases, leading to problems about the protection of resources. In addition, in order to recycle paper sheets on which images are printed with a printer or a copier, it is necessary to use a large amount of bleaching agent and water, which brings about a rise in recycling cost. Thus, it is proposed to reduce consumption of paper sheets substantially by printing an image on a paper sheet using a decolorable image forming material, decoloring the formed image to return the paper sheet to a blank sheet, reusing the blank sheet, and recycling the sheet at the time when damage of the sheet becomes serious so that the sheet cannot be reused.

Recently, rewritable paper has been proposed in order to reuse hard copy paper sheets. However, this rewritable paper is applicable only to thermal recording and is not recyclable because it is made of special paper, although it is reusable.

Heretofore, an image forming material that can be decolored by heating has been proposed in, for example, Published Unexamined Japanese Patent Application No. 7-81236. The image forming material includes a color former such as a leuco dye, a developer, and an organophosphoric compound having decoloring ability. When such an image forming material is used, however, decoloration is insufficient and, as a result, a paper sheet is hard to return to the blank state.

We have been developing a decolorable image forming material in which a color former, a developer and a decolorant compatible with the developer are dispersed in a binder resin. Now, it becomes possible to obtain an excellent decolored state in various material systems by heating or by contact with a solvent. However, since some of the decolorants showing excellent performance are relatively expensive, it is desirable to reduce the amount of decolorant used.

As for decoloration of an image of a decolorable image forming material, it is found that the amount of the decolorant required to obtain an excellent decolored state can be made smaller in solvent decoloration than in thermal decoloration. Therefore, the amount of the decolorant contained in the decolorable image forming material is determined based on the amount required for the thermal decoloration.

However, when the amount of the decolorant in the image forming material is excessively large, reflection density of a developed image may vary depending on a manufacturing lot because dispersion of the components in a matrix material is made inhomogeneous, or fixing defects may be caused due to lack of the matrix material.

If paper sheets are reused in an office where paper consumption is large, use of a solvent is undesirable from the viewpoint of, for example, its smell. Further, it is preferable to heat paper sheets stacked into a bundle so as to handle a large amount of paper sheets at one time. However, such processing conditions or decolorable image forming materials appropriate for those conditions have not been studied so far, and, therefore, it is found that an excellent decolored state cannot be obtained in some cases.

BRIEF SUMMARY OF THE INVENTION

An object of the present invention is to provide an image forming material that is capable of forming a clear image and that can be decolored well, even if the amount of a decolorant used is small. Another object of the present invention is to provide an image forming material that can be decolored well when a bundle of paper sheets is heated in order to handle a large amount of paper sheets at one time, and to provide such a method.

According to one aspect of the present invention, there is provided a decolorable image forming material comprising a color former, a developer, a matrix material, and a decolorant capable of adsorbing the developer physically or chemically, wherein the developer has a molecular weight of 120 to 210.

According to another aspect of the present invention, there is provided a paper medium comprising a paper sheet, and an image forming material, applied to the paper sheet, and comprising a color former, a developer having a molecular weight of 120 to 210, a matrix material, and a decolorant.

According to still another aspect of the present invention, there is provided a method of decoloring an image of a decolorable image forming material comprising steps of heating paper sheets applied with a material comprising a color former, a developer having a molecular weight of 120 to 210, a matrix material, and a decolorant, in a temperature range of 100 to 140° C., thereby decoloring an image of the material; and cooling the paper sheets.

BRIEF DESCRIPTION OF THE SEVERAL VIEWS OF THE DRAWING

The single FIGURE is a diagram showing TGA curves of a color former, developer, decolorant, and a mixture thereof.

DETAILED DESCRIPTION OF THE INVENTION

The present invention will now be described in more detail.

The present inventor examined the reason why the amount of decolorant required to obtain an excellent decolored state is smaller in solvent decoloration than in thermal decoloration. As a result, it is concluded as follows. That is, in the case of the solvent decoloration, it is thought that the paper sheet captures a part of the developer, which has become possible to diffuse freely in the solvent. On the other hand, in the case of the thermal decoloration, it is considered that diffusion of the developer is substantially restricted within the image forming material, and therefore a larger amount of decolorant is required to capture all the developer.

Next, the present inventor studied heating conditions of the case where an image formed on a paper sheet with an image forming material is decolored by heating. To start with, decolored states obtained by heating under high temperature conditions were examined from the viewpoint of efficiency of the heating process. As a result, it was found that the high temperature conditions caused the following problems. That is, if a paper sheet applied with an image forming material was kept in atmosphere at high temperatures for a long period of time, the color former was subjected to chemical reaction that results in discoloration, and therefore it became not possible to decolor images completely. At the same time, the paper sheet itself was gradually carbonized and discolored to brown. In order to deal with the above problems, the present inventor attempted to keep a paper sheet applied with an image forming material at high temperatures only for a short period of time so as to prevent the discoloration of the paper sheet and the color former. However, it was found that, although these conditions were suitable for treating paper sheets one by one, they were not suitable for treating a bundle of paper sheets to decolor a large amount of paper at one time. This is because it requires some extent of time for conduction of heat to the central portion of the bundle of paper sheets. From these results, it has been found that, in order to treat paper sheets in a batch by thermal decoloration, it is preferable to employ a method in which a bundle of paper sheets be kept at relatively low temperatures for some extent of time.

Presuming a method that would be employed in an office, a bundle of paper sheets subjected to thermal decoloration would be put in a high-temperature box before staffs go home, and the bundle would be taken out from the box in the next morning for reuse. The present inventor considered that it would be preferable for the above method if an image forming material could be decolored by heating for several hours.

Then, the present inventor examined the temperature dependency of color of a paper sheet and a color former, in order to determine the upper limit of temperature in thermal decoloration performed over several hours. A bundle of 100 paper sheets with an image forming material applied thereto was put in a thermostat. After the bundle of sheets was heated at a predetermined temperature for 5 hours, the color of the paper sheets was examined. The color values of the paper sheets were measured with a colorimeter (CR-300 manufactured by MINOLTA CORP.), and were expressed in terms of La*b* color space. The results are indicated in TABLE 1.

TABLE 1

|    | R.T. | 115° C. | 130° C. | 142° C. | 155° C. | 170° C. | 200° C. |
|----|------|---------|---------|---------|---------|---------|---------|
| L  | 91.9 | 91.9    | 91.8    | 91.7    | 91.4    | 90.3    | 68.5    |
| a* | 6.4  | 7.5     | 6.8     | 6.4     | 6.2     | 5.4     | 10.8    |
| b* | -7.8 | -7.2    | -6.4    | -5.6    | -3.5    | 1.7     | 23.5    |

It is judged from TABLE 1 that the heating temperature must be 170° C. or less in order not to drastically decrease the reflection density of the paper sheet, i.e., the background. In order to suppress the change in color of the paper sheet, especially, the increase in the b* value, which indicates a change in the direction toward red, it requires further lower temperature for heat treatment. From these results, it has been determined that the upper limit of the heating temperature, where no substantial deterioration of the quality of the paper sheet is recognized by naked eye, is 155°.

Next, the present inventor studied about discoloration of a color former. Leuco dye Blue 63 serving as a color former, ethyl gallate serving as a developer, starch as a decolorant and a binder resin were kneaded to prepare a sample of an image forming material. In the sample, the color former and the developer were mixed at a molar ratio of 1:1, and the content of the developer in the binder resin was set to one percent by weight. A pattern of the developed image forming material was formed on a paper sheet, and then the sheet was kept standing for a predetermined period of time at a temperature not more than 155° C. Thus, the change in the color of the pattern made of the image forming material was examined. As in the above case, the color values were measured with a colorimeter, and were expressed in terms of La*b* color space. The results are indicated in TABLE 2. It should be noted that "B.G." in TABLE 2 indicates the values for the background paper sheet.

TABLE 2

| time  | 130° C. |       |        | 142° C. |       |        | 155° C. |       |        |
|-------|---------|-------|--------|---------|-------|--------|---------|-------|--------|
| [min] | L       | a     | b      | L       | a     | b      | L       | a     | b      |
| 0     | 42.23   | 22.13 | -41.71 | 39.78   | 23.57 | -42.66 | 42.30   | 21.69 | -41.40 |
| 10    | 49.97   | 20.64 | -41.43 | 50.58   | 20.11 | -40.89 | 52.73   | 19.12 | -39.44 |
| 30    | 54.14   | 18.99 | -39.73 | 55.94   | 17.95 | -38.36 | 64.63   | 13.48 | -30.02 |
| 60    | 58.16   | 17.23 | -37.41 | 65.21   | 13.66 | -30.94 | 84.23   | 6.77  | -5.44  |
| 120   | 64.18   | 14.20 | -32.16 | 79.30   | 8.20  | -14.31 | 85.45   | 6.31  | -0.99  |
| 180   | 69.56   | 11.63 | -26.46 | 86.37   | 6.27  | -3.93  | 84.85   | 6.11  | 0.37   |
| 300   | 82.96   | 7.05  | -9.54  | 86.05   | 6.36  | -2.15  | 84.17   | 6.17  | 1.97   |
| 420   | 86.15   | 6.33  | -4.23  | 85.70   | 6.28  | -1.12  | 83.61   | 6.18  | 3.15   |
| B.G.  | 91.8    | 6.4   | -7.8   | 91.7    | 6.4   | -5.6   | 91.4    | 6.2   | -3.5   |

As shown in TABLE 2, when the paper sheet was kept standing for several hours at 142° C., there was observed change in color of the color former, which was not negligible, especially, increase in the b* value indicating change in the direction toward red. It can be seen from the results that the color former would be discolored even at a lower temperature than in the case of paper. Although TABLE 2 indicates the data for an example of color former, similar results are obtained for other color formers. Therefore, the heating temperature for thermal decoloration should preferably be set to 140° C. or less.

On the other hand, it is also important to avoid decrease in developed image density at the time of preparing the image forming material. The image forming material of the present invention is prepared by kneading a color former, as a developer, a decolorant and a binder resin with setting the kneading temperature to a range of 80° C. to 100° C. Therefore, the heating temperature during thermal decoloration must be 100° C. or higher.

As described above, in order to decolor the image forming material of the present invention by heating, the heating temperature should desirably be set to a range of 100 to 140° C.

In the case where the image forming material is decolored in the above range of temperature, an excellent decolored state can be obtained if the content of the color former is low as about one percent by weight. However, it has been found that, as the content of the color former increases, residual images may be left depending on a type of the developer.

The present inventor has found that residual images are easily left if a developer having a low diffusion rate in a binder resin is used in the above-mentioned range of temperature. The decolorable image forming material of the present invention employs a developer of such a type that has a low molecular weight and is easily diffusible in the binder resin even in the above decoloring temperature. In the image forming material containing such a developer, the developer can be easily diffused at relatively low temperature, and therefore the interaction between the developer and the color former is lost, thereby making it possible to obtain an excellent decolored state. However, when the molecular weight of the developer is excessively low, the developer is eliminated by evaporation while kneading the components at 80 to 100° C. during the preparation of the image forming material, thereby lowering the developed image density.

Therefore, the image forming material of the present invention employs a developer having a molecular weight within an appropriate range so that the image can be decolored in several hours at a decoloring temperature of 100 to 140° C., and that the material is not decolored during the kneading step carried out at 100° C. or less. In the present invention, an appropriate range of the molecular weight of the developer is 120 to 210.

In the meantime, it is known that an image forming material containing a volatile developer, but not containing a decolorant, can be decolored by heating (See Jpn. Pat. Appln. KOKAI Publication No. 1-138275.) However, if the volatility of the developer is excessively high, the evaporated developer may cause an environmentally adverse effect as well as the developed image density is lowered as described above. Under the circumstances, it is necessary to select a developer that remains within the image forming material and inside the paper when the material is heated.

The components used in the image forming material of the present invention will now be described in detail.

Examples of the color former are electron-donating organic substances such as leucoauramines, diarylphthalides, polyarylcarbinoles, acylauramines, arylauramines, Rhodamine B lactams, indolines, spiropyrans, and fluorans.

Practical examples of the color former are Crystal Violet lactone (CVL), Malakite Green lactone, 2-anilino-6-(N-cyclohexyl-N-methylamino)-3-methylfluoran, 2-anilino-3-methyl-6-(N-methyl-N-propylamino)fluoran, 3-[4-(4-phenylaminophenyl)aminophenyl]amino-6-methyl-7-chlorofluoran, 2-anilino-6-(N-methyl-N-isobutylamino)-3-methylfluoran, 2-anilino-6-(dibutylamino)-3-methylfluoran, 3-chloro-6-(cyclohexylamino)-fluoran, 2-chloro-6-(diethylamino)fluoran, 7-(N,N-diethylamino)-3-(N,N-diethylamino)fluoran, 3,6-bis(diethylamino)fluoran-γ-(4'-nitroanilino)lactam, 3-diethylaminobenzo[a]fluoran, 3-dietylamino-6-methyl-7-aminofluoran, 3-diethylamino-7-xylidinofluoran, 3-(4-diethylamino-2-ethoxyphenyl)-3-(1-ethyl-2-methylindole-3-yl)-4-azaphthalide, 3-(4-diethylaminophenyl)-3-(1-ethyl-2-methylindole-3-yl) phthalide, 3-diethylamino-7-chloroanilinofluoran, 3-diethylamino-7,8-benzofluoran, 3,3-bis(1-n-butyl-2-methylindole-3-yl)phthalide, 3,6-dimethylethoxyfluoran, 3,6-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl)leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran, 8'-methoxy-N,3,3-trimethylindolinobenzospiropyran, 3-diethylamino-6-methyl-7-chlorofluoran, 3-diethylamino-7-methoxyfluoran, 3-diethyamino-6-benzyloxyfluoran, 1,2-benzo-6-diethyaminofluoran, 3,6-di-p-toluidino-4,5-dimetylfluoran, phenylhydrazide-γ-lactam, and 3-amino-5-methylfluoran. These color formers can be used singly or in the form of a mixture of two or more species. If color formers are selected properly, a variety of color developed states can be obtained, and thus a multicolor image can be formed.

Examples of the developer are phenols, metal phenolates, metal carboxylates, benzophenones, sulfonic acids, sulfonates, phosphoric acids, metal phosphates, acidic phosphoric esters, acidic phosphoric ester metal salts, phosphorous acids, and metal phosphites. Especially, phenol compounds containing two or more hydroxyl groups are preferable. In the present invention, it is important that high density developed color is obtained during the preparation of the image forming material, and an excellent decolored state can be obtained under a heating condition in a range of 100 to 140° C. which is employed when a bundle of paper sheets is decolored at one time. In order to meet the above requirements, a developer having a molecular weight of 120 to 210 is used as described above. These developers can be used singly or in the form of a mixture of two or more species.

Especially preferable examples of the developer are bisphenol (having a molecular weight MW of 186), methyl gallate (MW: 184), ethyl gallate (MW: 198), 4,4'-oxybisphenol (MW: 202), methylenebisphenol (MW: 202), phenylmethylbenzenediol (MW: 200), 2,4-dihydroxyacetophenone (MW: 152), 2,3,4-trihydroxyacetophenone (MW: 168), methyl 2,3-dihydroxybenzoate (MW: 164), methyl 2,6-dihydroxybenzoate (MW: 164), ethyl 2,3-dihydroxybenzoate (MW: 180), ethyl 3,5-dihydroxybenzoate (MW: 180), ethyl 2,6-dihydroxybenzoate (MW: 180), and propyl 2,3-dihydroxybenzoate (MW: 196).

Examples of the decolorant (decoloring agent) used in the present invention are sterol compounds such as animal sterins, plant sterins, fungi sterins, and their derivatives. Practical examples of the animal sterins are cholesterol, lanosterol, lanostadial, agnosterol, cholestanol, coprostanol, ostreasterol, actiniasterol, spongosterol, and clionasterol; examples of the bile acid are cholanoic acid, cholic acid, hyodeoxycholic acid, and lithocholic acid; examples of the plant sterins are stegmasterol, α-sitosterol, β-sitosterol, γ-sitosterol, brassicasterol, and vitamin D; and an example of the fungi sterins is ergosterol. These compounds can be used singly or in combination of two or more species. Some of these compounds may be mixed to be used. Also, a material, which is originally a mixture, such as lanoline alcohol may be used. For example, cholesterol, which is an animal sterin, is used as a feeding stuff for shrimps, and therefore it has high safety. On the other hand, it is not desirable to use toxic materials such as digilanide, digoxigenin, digitoxin, digitoxigenin, bufotalin, bufotoxin, strophanthin, strophanthidin and scillaren.

Examples of the decolorant exhibits an excellent decoloring performance when it is mixed with a steroid-based decolorant are cyclic sugar alcohols and their derivatives. Practical examples are D-glucose, D-mannose, D-galactose, D-fructose, L-sorbose, L-rhamnose, L-fucose, D-ribodesose, α-D-glucose pentaacetate, acetoglucose, diacetone-D-glucose, D-glucuronic acid, D-galacturonic acid, D-glucosamine, D-fructosamine, D-isosaccharic acid, vitamin C, erutorubic acid, trehalose, saccharose, maltose, cellobiose, gentiobiose, lactose, melibiose, raffinose, gentianose, melizitose, stachyose, methyl-α-glucopyranoside, salicin, amygdalin, euxanthic acid and 1,2:5,6-diisopropylidene-D-mannitol. One or more types of these compounds can be used. Sugars are used widely as food and have high safety.

Also, examples of the decolorant exhibits an excellent decoloring performance when it is mixed with a steroid-based decolorant are non-aromatic cyclic compounds of a five-membered or larger ring having a hydroxyl group, and derivatives of cyclic sugar alcohols. Practical examples are alicyclic monohydric alcohols such as cyclododecanol, hexahydrosalicylic acid, menthol, isomenthol, neomenthol, neoisomenthol, carbomenthol, α-carbomenthol, piperithol, α-terpineol, β-terpineol, γ-terpineol, 1-p-menthene-4-ol, isopulegol, dihydrocarveol, and carveol; alicyclic polyhydric alcohols such as 1,4-cyclohexanediol, t-1,2-cyclohexanediol, phloroglucitol, quercitol, inositol, 1,2-cyclododecanediol, quinic acid, 1,4-terpene, 1,8-terpene, pinol hydrate, and betulin; polycyclic alcohol derivatives such as borneol, isoborneol, adamantanol, norborneol, fenchol, and camphor; and derivatives of cyclic sugar alcohols such as 1,2:5,6-diisopropylidene-D-mannitol. In particular, in order to improve thermal stability, it is effective to design a molecular to have a structure having a larger steric hindrance by bonding a plurality of compounds having cyclic structure.

In the present invention, it is preferable that a polymer decolorant should be used. The polymer decolorant is preferably selected from the group consisting of a polymer compound having a sugar skeleton, polyamino acid, a polymer compound having a hydroxyl group, a polymer compound having an amino group, polyvinylacetal, polyacrylonitrile, and their derivatives, and a mixture thereof.

Examples of this polymer compound having a sugar skeleton are starch such as α-starch, β-starch, corn starch, potato starch, and dogtooth violet starch; grain powders containing starch as its main component such as wheat flour, barley flour, rye flour, and rice flour; starch derivatives such as methylstarch, ethylstarch, acetylstarch, and nitrostarch; cellulose; cellulose derivatives such as cellulose acetate, methylcellulose, ethylcellulose, and nitrocellulose; polysaccharides and their derivatives such as dextrin, dextran, mannan, amylopectin, amylose, xylan, glycogen, inulin, lichenin, chitin, hemicellulose, pectin, vegetable gum, agarose, carrageenin, and saponin.

When the polymer compound having a sugar skeleton is used as a polymer decolorant for toner, an effect of preventing offset (a phenomenon in which a portion of toner adheres to the surface of a heat roller) can also be obtained. This is presumably because the polymer compound having a sugar skeleton has a high affinity for fibers of paper and therefore has a function of increasing the adhesion of the image forming material to paper. This function is particularly notable in starch and its derivatives. If, for example, offset occurs and damages the matrix material, components in the image forming material readily flow out during decoloration of an image on a paper sheet. This disables the polymer decolorant to well adsorb the developer, resulting in decoloration defects. Accordingly, improvement in the offset resistance leads to improvement in the decoloration property. If some of hydroxyl groups contained in the sugar skeleton are substituted by, for example, acetyl groups, humidity resistance of the image forming material can be controlled. The ratio of substitution of a hydroxyl group with another group is preferably determined in accordance with the content of the polymer decolorant in the image forming material.

Polyamino acid used as the polymer decolorant is a homopolymer of amino acid having a hydroxyl group, amino group, or oxycarbonyl group and a derivative of the amino acid, or a copolymer containing 5% or more of the amino acid and its derivative. Practical examples are threonine, serine, cystine, hydroxyproline, tryptophan, aspartic acid, glutamic acid, arginine, lycine, ornithine, and histidine.

Glycoprotein as a combination of sugar and protein also functions as the polymer decolorant. Examples of this glycoprotein are collagen, Taka-amylase A, casein, germ glycoprotein, and egg albumin.

A polymer compound having a hydroxyl group usable as the polymer decolorant means a polymer compound capable physically or chemically adsorbing the developer by donating electrons from lone-pair electrons of oxygen atoms. From this viewpoint, a phenolic resin that has a phenolic hydroxyl group and exhibits a developing function is not included in the polymer decolorant. Polyvinyl alcohol is a typical example of the polymer compound having a hydroxyl group. Although polyvinyl alcohol also has the function of the binder resin, the humidity resistance of the image forming material decreases if the content is too large. The humidity resistance of the image forming material can be improved by substituting a portion of a side-chain hydroxyl group of polyvinyl alcohol with an acetyl group, an alkyl group, or the like. In this case, as described in the above case, the ratio of substitution of a hydroxyl group with another group is preferably determined in accordance with the content of the polymer decolorant in the image forming material.

A polymer compound having an amino group usable as the polymer decolorant means a polymer compound capable of adsorbing the developer physically or chemically by donating electrons from lone-pair electrons of nitrogen atoms. This polymer compound may or may not have an aromatic ring. Preferable examples of the polymer compound having an amino group are homopolymers such as polyvinylpyridine, polyvinylpyrazine, polyvinylpyrimidine, polyvinylimidazole, polyvinylpyrrole, polyvinylcarbazole, polyvinylpyrrolidine, polyvinylpiperidine, polyvinylpiperazine, and polyvinylmorpholine, and a copolymer containing 5% or more of any of these monomers containing an amino group. A polymer compound in which an amino group is introduced to the benzene ring of polystyrene is also usable as the polymer decolorant. Practical examples are polyvinylaniline, polystyrene substituted by a quaternary ammonium salt used as an anion exchange resin, polystyrene substituted by an amino group having an ethylenediamine skeleton, and their derivatives. The substitution ratio of an amino group is arbitrary, but preferably 5% or more.

Here, the only one FIGURE shows TGA curves of Crystal Violet lactone (CVL) serving as a color former, propyl gallate serving as a developer, pregrenolone serving as a decolorant, and a mixture thereof (mixing ratio of color former:developer:decolorant=1:1:10). From this figure, the weight of propyl gallate begins to decrease from about 190° C., and therefore it is considered that propyl gallate is evaporated at the above temperature or higher. However, as described above, the image forming material of the present invention can be decolored at a temperature far lower then 190° C. It can be concluded from this fact that decoloration is not caused by evaporation of the developer, but it is caused by diffusion of the developer in the matrix agent, which reduces interaction between the developer and color former.

In the present invention, the matrix agent means a binder resin used to hold the individual components of an image forming material, or a wax component used to adjust the physical properties of an image forming material. The binder resin used in the present invention is not particularly limited as long as the resin is used in usual electrophotographic toner, liquid ink, ink ribbon, and writing ink. As a toner binder resin, a resin having a glass transition point (Tg) of 40° C. or more is preferably used from the viewpoint of temperature stability. Practical examples are polystyrene, a styrene-acrylate copolymer, a styrene-acrylic acid copolymer, a styrene-methacrylate copolymer, styrene-methacrylic acid copolymer, polyester, an epoxy resin, a styrene-butadiene copolymer, a styrene-propylene copolymer, styrene-butadiene rubber, a styrene-maleic ester copolymer, and a styrene-maleic anhydride copolymer. These binder resins can be used singly or blended. As a thermal transfer ink binder resin, a resin having a Tg of 70° C. or less is preferably used from the viewpoint of thermal transfer sensitivity. Practical examples are an ethylene-vinyl acetate copolymer and polyester. These binder resins can be used singly or blended.

As the wax component, it is possible to use higher alcohols, higher ketones, higher aliphatic esters, low-molecular weight polypropylenes, low-molecular weight polyethylenes, low-molecular weight polybutylenes, low-molecular weight polyalkanes, and natural waxes such as rice wax. The acid value of the wax component is preferably 10 or less. The weight-average molecular weight of the wax component is preferably $10^2$ to $10^5$, and more preferably, $10^2$ to $10^4$.

In order to decolor the image of the image forming material of the present invention, employed is a method comprising steps of heating a bundle of stacked paper sheets applied with an image forming material comprising a color former, a developer having a molecular weight of 120 to 210, a matrix material, and a decolorant, in a temperature range of 100 to 140° C., thereby decoloring an image of the image forming material, and cooling the bundle of paper sheets. It is preferable that the heating time in the decoloring step should be 3 to 12 hours. This method is suitable for decoloring a large amount of paper in an office where paper consumption is large.

The image forming material of the present invention can be decolored with use of a solvent. The decoloring solvent used for decoloring the image forming material of the present invention is required to have the following characteristics: (1) The decoloring solvent preferably should assist for the decolorant to adsorb the developer interacting with the color former physically or chemically and to hold it; and (2) the decoloring solvent preferably has a high affinity with the binder resin so as to be able to penetrate to the inside of the image forming material on the paper surface, and does not dissolve the binder resin or decolorant in a time scale until being evaporated.

Suitable decoloring solvents are ethers, e.g., ethylether, ethylpropylether, tetrahydrofuran, tetrahydropyran, and dioxane; cellosolves, e.g., 2-methoxyethanol, 2-ethoxyethanol, 1,2-dimethoxyethane, and 1,2-diethoxyethane; ketones, e.g., acetone, methylethylketone, methylpropylketone, diethylketone, cyclopentanone, and cyclohexane; esters, e.g., ethyl acetate, ethyl lactate, methyl propionate, and ethyl butyrate; and methylene chloride, N-methylpyrrolidinone, dimethylformamide, dimethylacetamide, and dimethylsulfoxide. These solvents can be used singly or in the form of a mixture of two or more different solvents. If this is the case, the mixing ratio can be any arbitrary ratio.

In addition to the above solvents, some solvents can achieve the decoloring property depending on the type of matrix agent. Examples of such solvents are alcohols, e.g., methyl alcohol, ethyl alcohol, propyl alcohol, and isopropyl alcohol; and water and aqueous basic solutions. These solvents are particularly effective to an image forming material, such as crayon, in which the ratio of the wax component is large. Also, the efficiency of image decoloration sometimes rises when these solvents are added to the aforementioned decoloring solvent.

The above decoloring solvent can also be mixed with a solvent having a high affinity with the binder resin. Examples of such a solvent are toluene, xylene, cresol, dimethoxybenzene, hexane, cyclohexane, cyclopentane, petroleum ether, and benzine.

EXAMPLES

Examples of the present invention will now be described. In the following examples, an image was formed on a paper sheet of 500BLATT manufactured by NEUSIEDLER, as long as otherwise specified.

Example 1

Four parts by weight of 3-(4-dimethylamino-2-ethoxyphenyl)-3-(1-ethyl-2-methylindol-3-yl)azaphthalide as a color former, two parts by weight of ethyl gallate, having a molecular weight of 198.17, as a developer, one part by weight of polypropylene wax as a wax component, eight parts by weight of hydrophobic starch as a polymer decolorant, 84 parts by weight of polystyrene, having a molecular weight of 45,000, as a binder resin, and one part by weight of a charge control agent (LR-147 manufactured by Nippon Carret Inc.) were mixed, and the mixture was well kneaded using a kneader. The kneaded product was pulverized by a pulverizer to obtain a powder having an average particle size of 10 µm. One percent by weight of hydrophobic silica was externally added to the resultant powder to manufacture blue electrophotographic toner. The resultant toner was put into a toner cartridge of a plain paper copier (Premage 38 manufactured by TOSHIBA CORP.), and a standard patterned image for evaluation was transferred onto a paper sheet. The reflection density of the patterned image was measured with a Macbeth densitometer, and it was found to be about 1.0, indicating sufficiently high reflection density.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.05, so that the residual image could hardly be noticed. Even after the paper sheet was kept standing for 1000 hours at 55° C., the reflection density remained unchanged.

Comparative Example 1

Blue electrophotographic toner was manufactured in the same manner as in Example 1 except that stearyl gallate, having a molecular weight of 442.6, was used in place of ethyl gallate as a developer. The resultant toner was put into a toner cartridge of a plain paper copier (Premage 38 manufactured by TOSHIBA CORP.), and a standard patterned image for evaluation was transferred onto a paper sheet. The reflection density of the image was measured with a Macbeth densitometer, and it was found to be about 0.8.

The paper sheet was put in a thermostat and heated at 130±2° C. Comparing the reflection densities between a mark of the image forming material and the background, it was found that the difference in reflection density was about 0.2. A bluish residual image was noticeable with the naked eye, and thus the decoloration of the image was incomplete. After the paper sheet was kept standing for 1000 hours at 55° C., the reflection density remained unchanged.

Example 2

Four parts by weight of Crystal Violet lactone (CVL) as a color former, two parts by weight of 3,5-dihydroxymethyl benzoate, having a molecular weight of 154.12, as a developer, one part by weight of polypropylene wax as a wax component, 10 parts by weight of methyl cholate as a decolorant, 82 parts by weight of polystyrene as a binder resin, and one part by weight of a charge control agent (LR-147) were mixed, and the mixture was well kneaded using a kneader. The kneaded product was pulverized by a pulverizer to obtain a powder having an average particle size of 10 $\mu$m. One percent by weight of hydrophobic silica was externally added to the resultant powder to manufacture blue electrophotographic toner. The resultant toner was put into a toner cartridge of a plain paper copier, and a standard patterned image for evaluation was transferred onto a paper sheet. The reflection density of the patterned image was measured with a Macbeth densitometer, and it was found to be about 0.8, indicating sufficiently high reflection density.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.05, so that the residual image could hardly be noticed. Even after the paper sheet was kept standing for 1000 hours at 55° C., the reflection density remained unchanged.

Comparative Example 2

Blue electrophotographic toner was manufactured in the same manner as in Example 2 except that 2,2'-methylene bis[6-[(2-hydroxy-5-methylenephenyl)methyl]-4-methylphenol, having a molecular weight of 468, was used in place of 3,5-dihydroxymethyl benzoate as a developer. The resultant toner was put into a toner cartridge of a plain paper copier, and a standard patterned image for evaluation was transferred onto a paper sheet. The reflection density of the pattered image was measured with a Macbeth densitometer, and it was found to be about 0.6.

The paper sheet was put in a thermostat and heated at 130±2° C. Comparing the reflection densities between a mark of the image forming material and the background, it was found that the difference in the reflection density was about 0.2. A bluish residual image was noticeable with the naked eye, and thus the decoloration of the image was incomplete. After the paper sheet was kept standing for 1000 hours at 55° C., the reflection density remained unchanged.

Example 3

Four parts by weight of 3-(dimethylamino-2-ethoxyphenyl)-3-(1-ethyl-2-methylindol-3-yl)4-azaphthalide as a color former, two parts by weight of 2,3,4-trihydroxyacetophenon as a developer, two parts by weight of polypropylene wax as a wax component, eight parts by weight of fine powder of cellulose acetate having a degree of acetylation of 52% as a polymer decolorant, 83 parts by weight of styrene-acrylate copolymer having an acrylate content of five percent by weight as a binder resin, and one part by weight of a charge control agent (Bontron E-88 manufactured by Oriental Chemicals Co.) were mixed, and the mixture was well kneaded using a kneader. The kneaded product was pulverized by a pulverizer to obtain a powder having an average particle size of 10 $\mu$m. One percent by weight of hydrophobic silica was externally added to the resultant powder to manufacture blue electrophotographic toner. The resultant toner was put into a toner cartridge of a plain paper copier, and a standard patterned image for evaluation was transferred onto a paper sheet. The reflection density of the patterned image was measured with a Macbeth densitometer, and it was found to be about 0.7.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.04, so that the residual image could hardly be noticed. Even after the paper sheet was kept standing for 1000 hours at 55° C., the reflection density remained unchanged.

Example 4

51 g of leuco dye RED520, manufactured by Yamada Chemicals, 33 g of ethyl gallate, 100 g of waxy corn starch, and 916 g of styrene-butylacrylate copolymer having a butylacrylate content of six percent by weight were weighed, and then kneaded using a kneader in a color developed state. The kneaded product was pulverized by a pulverizer, and then classified with an air classifier to obtain powder having an average particle size of 0.8 $\mu$m. To 15 g of thus obtained powder, 35 g of limonene was added, and the mixture was dispersed for 1 hour using a paint shaker, thus preparing liquid ink. The obtained ink was put into stationary parts (FV-0200 manufactured by I & J FISNER Inc.) to manufacture a writing pen. With this pen, a solid image of 1 cm×1 cm was handwritten on a copy sheet. The reflection density of the image was measured with a Macbeth densitometer, and it was found to be about 0.8.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.05, so that the residual image could hardly be noticed. Even after the paper sheet was kept standing for 1000 hours at 55° C., the reflection density remained unchanged.

Example 5

Ethyl gallate and polypropylene wax were mixed at a ratio by weight of 1:10, and the mixture was well stirred at 130° C. The resultant mixture was pored into a vat to cool down it rapidly thereby to solidify. The obtained solid material was finely ground in a mortar to prepare a master batch. To the master batch, Leuco dye RED 520 (manufactured by Yamada Chemical Co. Ltd.) as a color former and hydrophobic starch as a decolorant were added such that ethyl gallate was 2 times that of the Leuco dye by molar ratio, and the hydrophobic starch was 5 times that of the Leuco dye by weight ratio. The resultant composition was again stirred under heating to 100° C. This mixture was poured into a mold to manufacture crayon. A 1 cm×1 cm solid pattern was drawn on a copy sheet with this crayon. The reflection density of the image was measured with a Macbeth densitometer, and it was found to be 1.0.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.05, so that the residual image could hardly be noticed.

Example 6

Two parts by weight of Leuco dye Blue 220 (manufactured by Yamamoto Kasei K.K.) as a color former, one part by weight of 3,5-dihydroxymethyl benzoate as a developer, 17 parts by weight of ethylene vinyl acetate copolymer (ELVAX200W manufactured by Mitsui-Du Pont Polychemical Inc.), 70 parts by weight of polyethylene wax as a wax component, and 10 parts by weight of corn starch as a polymer decolorant were mixed, and the mixture was well kneaded using a three-roll kneader. The kneaded product was applied on a base film at an application amount of about 5 g/m$^2$ by using a hot melt coater to manufacture a blue thermal transfer ink ribbon. This thermal transfer ink ribbon was set to a barcode printer (B-30 manufactured by TEC) to form an image on a thermal transfer paper sheet (JW-Z103). Thus, a barcode image having a reflection density of 0.7 was obtained.

The paper sheet was put in a thermostat and heated at 130±2° C. to decolor the image. When the paper sheet was viewed from a certain angle, a mark of resin left on the surface of the paper sheet after decoloration could be recognized with the naked eye due to reflection. However, comparing the reflection densities between the mark of the image forming material and the background, it was found that the difference in reflection density was about 0.05, so that the residual image could hardly be noticed. Even after the paper sheet was kept standing for 1000 hours at 55° C., the reflection density remained unchanged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A decolorable material comprising:
   a color former;
   a developer;
   a matrix material; and
   a decolorant capable of adsorbing the developer physically or chemically;
   wherein the developer has a molecular weight of 120 to 210, and the decolorant is selected from the group consisting of a polymer having a sugar skeleton, polyamino acid, a polymer having a hydroxyl group, a polymer having an amino group, polyvinyl acetal, polyacrylonitrile, and their copolymers, and a mixture thereof.

2. The material according to claim 1, wherein the developer is selected from the group consisting of methyl gallate, ethyl gallate, phenylmethylbenzenediol, 2,4-dihydroxyacetophenone, 2,3,4-trihydroxyacetophenone, methyl 2,3-dihydroxybenzoate, methyl 2,6-dihydroxybenzoate, ethyl 2,3-dihydroxybenzoate, ethyl 3,5-dihydroxybenzoate, ethyl 2,6-dihydroxybenzoate, and propyl 2,3-dihydroxybenzoate.

3. A writing pen comprising the decolorable material according to claim 1.

4. A thermal transfer ink ribbon comprising a base film and the decolorable material according to claim 1 coated on the base film.

5. A paper medium comprising:
   a paper sheet; and
   a material, applied to the paper sheet, and comprising a color former, a developer having a molecular weight of 120 to 210, a matrix material, and a decolorant, wherein the decolorant is selected from the group consisting of a polymer having a sugar skeleton, polyamino acid, a polymer having a hydroxyl group, a polymer having an amino group polyvinyl acetal, polyacrylonitrile, and their copolymers, and a mixture thereof.

6. The paper medium according to claim 5, wherein the developer is selected from the group consisting of methyl gallate, ethyl gallate, phenylmethylbenzenediol, 2,4-dihydroxyacetophenone, 2,3,4-trihydroxyacetophenone, methyl 2,3-dihydroxybenzoate, methyl 2,6-dihydroxybenzoate, ethyl 2,3-dihydroxybenzoate, ethyl 3,5-dihydroxybenzoate, ethyl 2,6-dihydroxybenzoate, and propyl 2,3-dihydroxybenzoate.

7. A decoloring method comprising steps of:
   heating paper sheets applied with a material comprising a color former, a developer having a molecular weight of 120 to 210, a matrix material, and a decolorant, in a temperature range of 100 to 140° C., thereby decoloring an image of the material; and cooling the paper sheets, wherein the decolorant is selected from the group consisting of a polymer having a sugar skeleton, polyamino acid, a polymer having a hydroxyl group, a polymer having an amino group polyvinyl acetal, polyacrylonitrile, and their copolymers, and a mixture thereof.

8. The method according to claim 7, wherein the developer is selected from the group consisting of methyl gallate, ethyl gallate, phenylmethylbenzenediol, 2,4-dihydroxyacetophenone, 2,3,4-trihydroxyacetophenone, methyl 2,3-dihydroxybenzoate, methyl 2,6-dihydroxybenzoate, ethyl 2,3-dihydroxybenzoate, ethyl 3,5-dihydroxybenzoate, ethyl 2,6-dihydroxybenzoate, and propyl 2,3-dihydroxybenzoate.

9. The method according to claim 7, wherein the heating is set to 3 to 12 hours.

* * * * *